(12) United States Patent
Tamai et al.

(10) Patent No.: US 6,769,389 B2
(45) Date of Patent: Aug. 3, 2004

(54) DUAL VOLTAGE TANDEM ENGINE START SYSTEM AND METHOD

(75) Inventors: Goro Tamai, West Bloomfield, MI (US); Tony T. Hoang, Warren, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/304,896

(22) Filed: Nov. 26, 2002

(65) Prior Publication Data

US 2004/0099234 A1 May 27, 2004

(51) Int. Cl.$^7$ ................................................. F02N 11/04
(52) U.S. Cl. ..................... 123/179.3; 290/34; 290/36 R
(58) Field of Search .......................... 123/179.3, 179.4; 290/31, 34, 35, 36 R, 37 R

(56) References Cited

U.S. PATENT DOCUMENTS 6,018,199 A * 1/2000 Shiroyama et al. ....... 290/37 A
6,240,890 B1 * 6/2001 Abthoff et al. .......... 123/179.3
6,555,927 B1 * 4/2003 Suzuki et al. .................. 290/34
2001/0049571 A1 * 12/2001 Shimizu et al. ............... 701/22

* cited by examiner

Primary Examiner—Andrew M. Dolinar
(74) Attorney, Agent, or Firm—Christopher DeVries

(57) ABSTRACT

A dual voltage tandem engine start system provides a method for high rotational speed, low emissions, heat-engine start-ups in a hybrid electric vehicle. The system also provides a reliable backup system that can be jumpstarted in an emergency should part of the vehicle's electrical system fail. At start-up, a conventional low voltage starter motor (typically 12-volt) begins turning the heat engine up to a predetermined initial engine RPM. When this RPM is reached, a higher voltage motor/generator, in tandem with the low voltage starter motor, also begins turning the heat engine. Once a second, predetermined heat engine RPM is reached, the low voltage starter motor stops turning the engine, leaving the motor/generator to turn the heat engine to a final engine RPM where it begins fueling and combustion starts. This final engine RPM is sufficiently high to allow a low engine emission start once fueling begins.

12 Claims, 4 Drawing Sheets

DUAL VOLTAGE TANDEM ENGINE START SYSTEM AND METHOD

TECHNICAL FIELD

This invention relates generally to a dual voltage tandem engine start system and method, and more specifically to a dual voltage tandem engine start system and method for starting hybrid electric vehicles.

BACKGROUND OF THE INVENTION

Hybrid electric vehicles achieve high fuel mileage and low vehicle emissions by combining a battery-powered electric motor/generator (MG) with a highly efficient heat engine, typically an internal combustion engine (ICE). By using on-board engine computer controls to vary when each engine or combination of engines are used, the hybrid motor vehicle can achieve peak efficiency in different driving conditions. Hybrid motor vehicles can be classified as "series" or "parallel" hybrid motor vehicles. Series hybrids only have the electric motor/generator powering the driving wheels, while the heat engine drives a generator that serves to recharge the electric motor's battery. Parallel hybrids use both the electric motor/ generator and the heat engine to provide power to the driving wheels. Most parallel hybrid vehicles do not fix the ratio of power from the electric motor/generator and the heat engine, but rather vary the ratio of power from the electric motor/generator and heat engine depending on which engine or motor or combination thereof has the greatest efficiency in a particular situation.

Parallel hybrid motor vehicles can be further classified as either "soft" (often also known as "mild") or "full." Soft or mild hybrids always operate with the heat engine powering the driving wheels, while the electric motor/generator provides extra power to the wheels in parallel with the heat engine's power only when needed. In contrast, full hybrids do not always have the heat engine powering the driving wheels. Depending on the power required at the driving wheels, the vehicle control unit will select between only the electric motor/generator driving the wheels, only the heat engine driving the wheels, or a combination of both electric motor/generator and heat engine driving the wheels in parallel. Typically, a full hybrid motor vehicle will utilize the electric motor/generator alone to power the driving wheels from a stop (such as a stoplight) or under light loads, such as in stop-and-go traffic; that is, under conditions in which the electric motor/generator can perform more efficiently at varying speeds and motor rotational speeds than can the heat engine. At constant loads, such as when cruising at a steady speed and RPM on the highway, the heat engine alone will power the driving wheels. When the full hybrid motor vehicle is under heavy load, such as when it is accelerating rapidly or driving up an incline, both the electric motor/generator and the heat engine will provide power to the driving wheels. Most parallel hybrid vehicles, whether they are full or soft hybrids, will turn off the heat engine when the car is stopped for an extended amount of time (for example, at a stoplight) to conserve fuel. The electric motor/generator, as well as the motor vehicle's electrical system, will remain on. As soon as the accelerator pedal is depressed, the heat engine will immediately start up (in the case of a soft hybrid) or will remain off until needed, with only the electric motor/generator powering the driving wheels (in the case of the full hybrid). Hybrid motor vehicles thus can achieve the same efficiency as a motor vehicle with a small engine, but without sacrificing undue amounts of power and engine performance.

Hybrid motor vehicles differ from conventional, fully electric vehicles by not requiring that the vehicle be "plugged in" to recharge the motor/generator's battery pack. Hybrid motor vehicles recharge their battery packs in the process of driving and, barring a dead battery or a system failure, do not require any outside battery charging. This battery recharging is done by the motor/generator in combination with the heat engine. The motor/generator is built in such a way that it functions as a motor, turning a crankshaft or driveshaft, when supplied with power, and functions as a generator, producing electric power, when the motor/generator's crankshaft or driveshaft is turned by some outside force. Thus, when the heat engine turns the motor/generator's crankshaft through a belt drive, system of gears, or the like, the motor/generator produces electricity that recharges the battery or battery pack. Most hybrid vehicles also utilize regenerative braking, in which the electric motor/generator is turned by the driveshafts connected to the driving wheels as the motor vehicle coasts to a stop, allowing the motor/generator to turn and recharge the battery or battery pack.

In most hybrid motor vehicles, the motor/generator, battery pack, and related hardware are designed to operate at a higher voltage than the voltage used throughout the rest of the motor vehicle. That is, hybrid vehicles retain the conventional 12-volt battery and related electronic equipment found in non-hybrid motor vehicles to run the hybrid motor vehicle's accessories (such as the headlights, radio, electronic componentry, engine computer, and the like) so as to keep the hybrid motor vehicles as unchanged as possible from conventional motor vehicles and thus cut down on manufacturing costs. Hybrid motor vehicles also utilize a separate, higher voltage motor/generator bus to power the driving wheels. There are a number of reasons for using a higher voltage motor/generator: it allows the engine to be restarted more quickly than is possible with a conventional 12-volt system, and it provides more power to the driving wheels when accelerating, hill climbing, and the like. The way in which the higher voltage system and the traditional 12-volt system are configured varies between different hybrid motor vehicle models. The most notable differences between dissimilar configurations are the way in which they perform the hybrid motor vehicle's "first start." "First start" refers to the motor vehicle being started for the first time after the motor vehicle has been completely shut off. "First start" does not refer to the motor vehicle's heat engine being started after a long stop, for example at a stoplight. Such starts that occur after a delayed stop (such as at a stoplight) will be referred to hereafter as "quick starts." It is desirable during the hybrid motor vehicle's first start to spin the heat engine up to a sufficiently high rotational speed before providing the heat engine with fuel, so that when fuel is delivered to the heat engine, the heat engine steadily achieves stable combustion without any of the faltering associated with a lower rotational speed start. By utilizing this high rotational speed start, emissions for the first start are dramatically lowered over a conventional, non-hybrid heat engines first start, and fuel economy is improved.

One conventional configuration of the 12-volt system and the higher voltage system has the higher voltage system performing the hybrid motor vehicle's first start while the 12-volt system is relegated to only powering the vehicle's accessories. This system allows for a high rotational speed heat engine start, and thus low emissions, but leaves no option for jumpstarting the hybrid motor vehicle should the higher voltage system ever have insufficient charge, unless a large DC-DC converter is provided that connects the 12-volt and the higher voltage systems. As almost all motor vehicles on the road today are 12-volt, jumpstarting a higher voltage hybrid motor vehicle with a 12-volt system will not work without this large DC-DC converter. Oversized DC-DC converters are expensive and add a great deal of cost to the system. Also, for the higher voltage system alone to provide a cold first start, it must have a battery pack and inverter switches that are greatly oversized compared to inverter switches designed only to work in warm climates. Oversized battery packs and inverter switches are also very expensive.

One alternative to an all-higher voltage engine starting system provides for a backup 12-volt starter motor that is used to start the heat engine only in emergency situations when the higher voltage system has insufficient battery charge. In normal operation, when the hybrid motor vehicle's batteries are all sufficiently charged to start the heat engine, only the higher voltage system provides a high RPM first start. If the higher voltage system's battery or battery pack is insufficiently charged, but the 12-volt battery is sufficiently charged, then the 12-volt battery can be used to start the heat engine. If neither the 12-volt battery nor the higher voltage battery or battery pack are sufficiently charged, the 12-volt battery can be jumpstarted or charged to the point where it can start the heat engine. This system is prone to failure, however, because starter motors must be used on a regular basis or they are prone to freeze up and fail. Thus, unless the backup 12-volt starter motor is used on a regular basis, it may not be operable in the emergency case of an uncharged higher voltage battery or battery pack.

Another electrical system configuration, similar to the previous one, has the 12-volt starter motor perform the heat engine's first start, with only the higher voltage system performing any other heat-engine quick starts during subsequent operation of the motor vehicle. The 12-volt system only powers the motor vehicle's accessories after the first start. Thus, the 12-volt starter motor is protected from freezing up from nonuse; however, utilizing only the 12-volt starter motor to perform the motor vehicle's first start does not allow the heat engine to reach a high enough rotational speed before receiving fuel to achieve a low emission start.

It is desirable to have an electrical system configuration that provides high rotational speed heat engine start-ups and the low emissions associated with such a start, but at the same time has a reliable backup system that can start the motor vehicle should part of the electrical system ever fail. The entire electrical system should also avoid the use of oversized DC-DC converters, battery packs, or oversized inverter switches in order to keep manufacturing costs down. Accordingly, a need exists for a dual voltage tandem engine start system that overcomes the problems attendant with prior art start systems.

BRIEF DESCRIPTION OF THE DRAWINGS

The method of application will be understood after review of the following description considered together with the drawings in which.

DESCRIPTION OF THE PREFERRED EMBODIMENT

Figure 1:
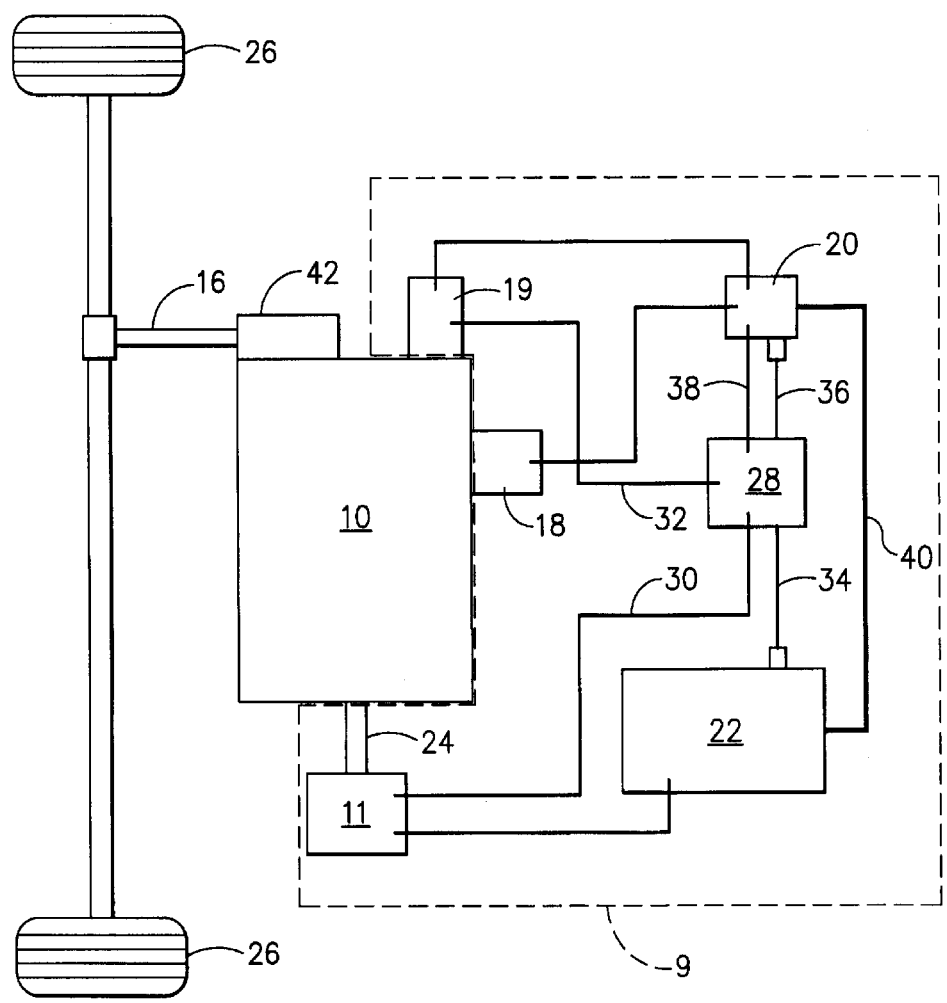
FIG. 1 schematically illustrates an application of a dual voltage tandem start system in accordance with one embodiment of the invention.

A dual voltage tandem start system, in accordance with an embodiment of the invention, utilizes a combination of a low voltage (typically 12-volt) system in tandem with a higher voltage system to start a hybrid motor vehicle's heat engine for the heat engine's first start. FIG. 1 illustrates schematically a dual voltage tandem engine start system 9 coupled to heat engine 10. The heat engine can be, for example, a turbine, an internal combustion engine, or the like. Without loss of generality and without limitation, the heat engine will hereafter be referred to as an internal combustion engine (ICE). The dual voltage tandem engine start system includes of a high voltage system (high voltage in this case referring to any voltage greater than the low voltage system) that is comprised of motor/generator (MG) 11, its battery pack 22, and coupling 24. Battery pack 22 may be, for example, a single high voltage battery, two or more batteries arranged in series or parallel, or the like. MG 11 is designed in such a way that it acts as a motor when it receives electric power from the battery pack, allowing it to deliver power to the hybrid motor vehicle's driving wheels 26 through transmission 42 of driveshaft 16 or to start ICE 10 through coupling 24. When MG 11 is turned by driveshaft 16 or by ICE 10 (through coupling 24), MG 11 acts as a generator, allowing it to charge battery pack 22. Coupling 24 may be, for example, a system of gears, a belt drive, or the like. MG 11 is connected to a control unit 28 by electrical leads 30. Electrical leads 30 allow signals corresponding to the motor/generator's activity to be sent to control unit 28. Control unit 28 is able to monitor the motor/generator's activity, as well as to send command signals back to the motor/generator through electrical leads 30. Control unit 28 also monitors the internal combustion engine's rotational speed (for example, in RPM) and controls fueling of ICE 10. Control unit 28 may be, for example, a stand-alone microprocessor, a portion of the engine control unit, or the like. A charge sensor 34 allows control unit 28 to monitor voltage drop and the amount of charge in battery pack 22.

Dual voltage tandem engine start system 9 also has a conventional low voltage starter system comprised of low voltage starter motor 19, low voltage battery pack 20, and alternator 18. Without loss of generality and without limitation, components of the low voltage system will hereafter be referred to as 12-volt components. Starter motor 19 is connected to ICE 10 and is powered by 12-volt battery pack 20. The 12-volt battery pack may be, for example, a single 12-volt battery, two or more 12-volt batteries in parallel, or the like. The 12-volt battery pack is charged by alternator 18, which is turned by ICE 10. Electrical leads 32 connect starter motor 19 to control unit 28. Electrical leads 32 allow signals corresponding to the starter motor's activity to be sent to control unit 28. Control unit 28 is able to monitor the starter motor's activity, as well as to send command signals back to the starter motor through electrical leads 32. A charge sensor 36 allows control unit 28 to monitor voltage drop and amount of charge in 12-volt battery pack 20. Control unit 28, being 12-volt based, is powered by 12-volt battery pack 20 through electrical leads 38. High voltage battery pack 22 and 12-volt battery pack 20 are connected to each other through DC-DC converter 40.

Figure 2A:
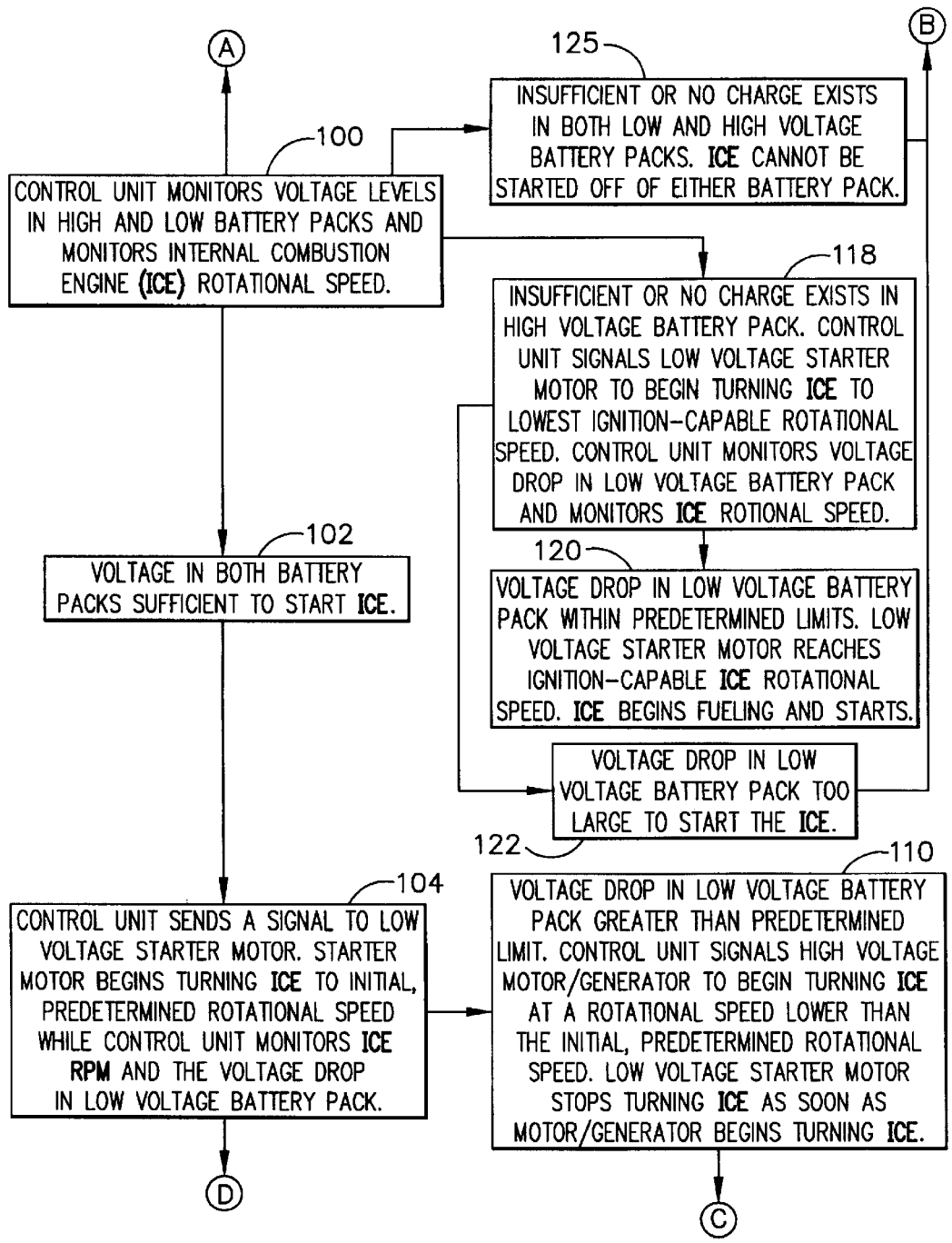
FIG. 2 illustrates a process in accordance with the invention in a flow chart format.
Figure 2B:
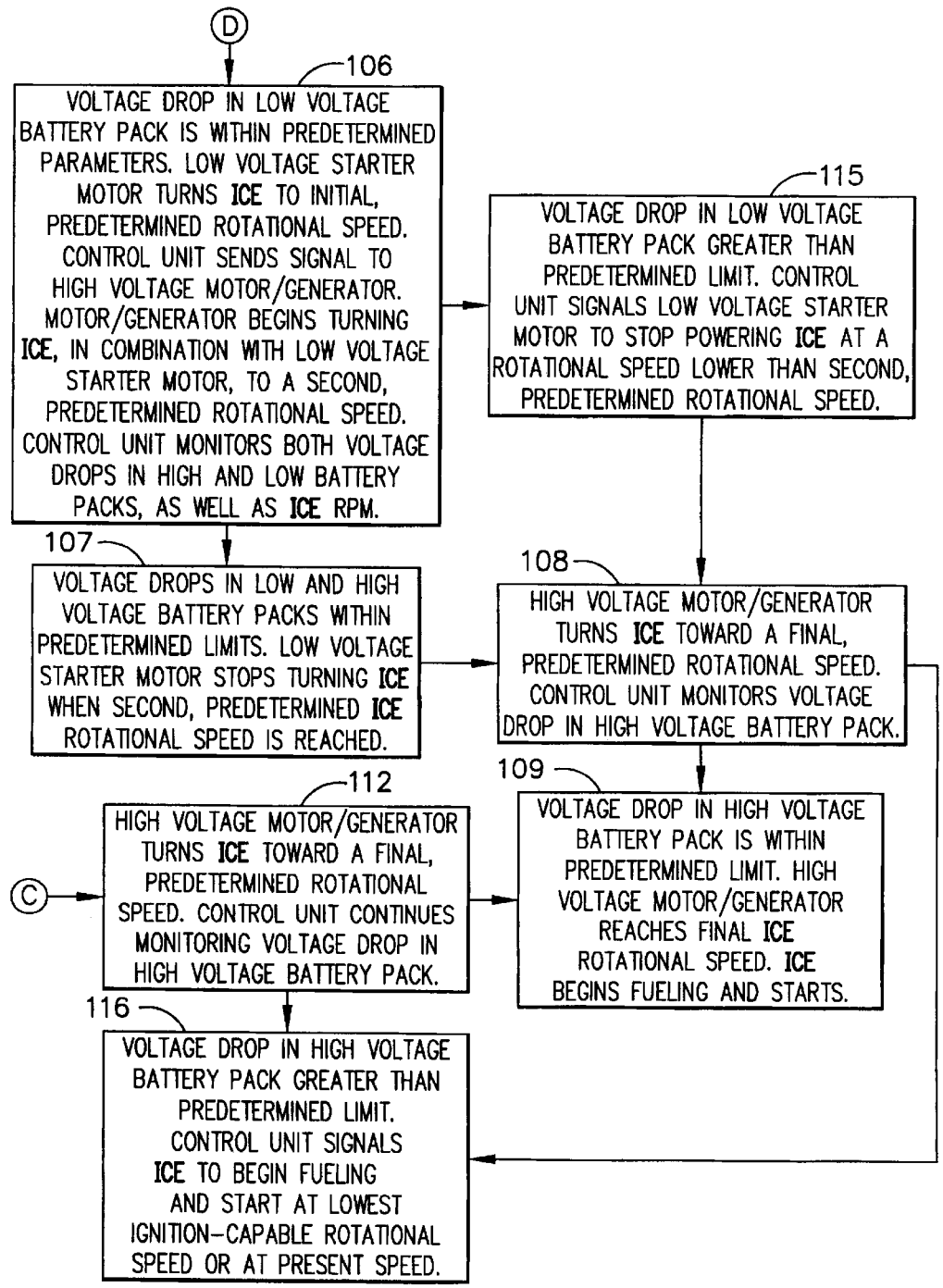
Figure 2C:
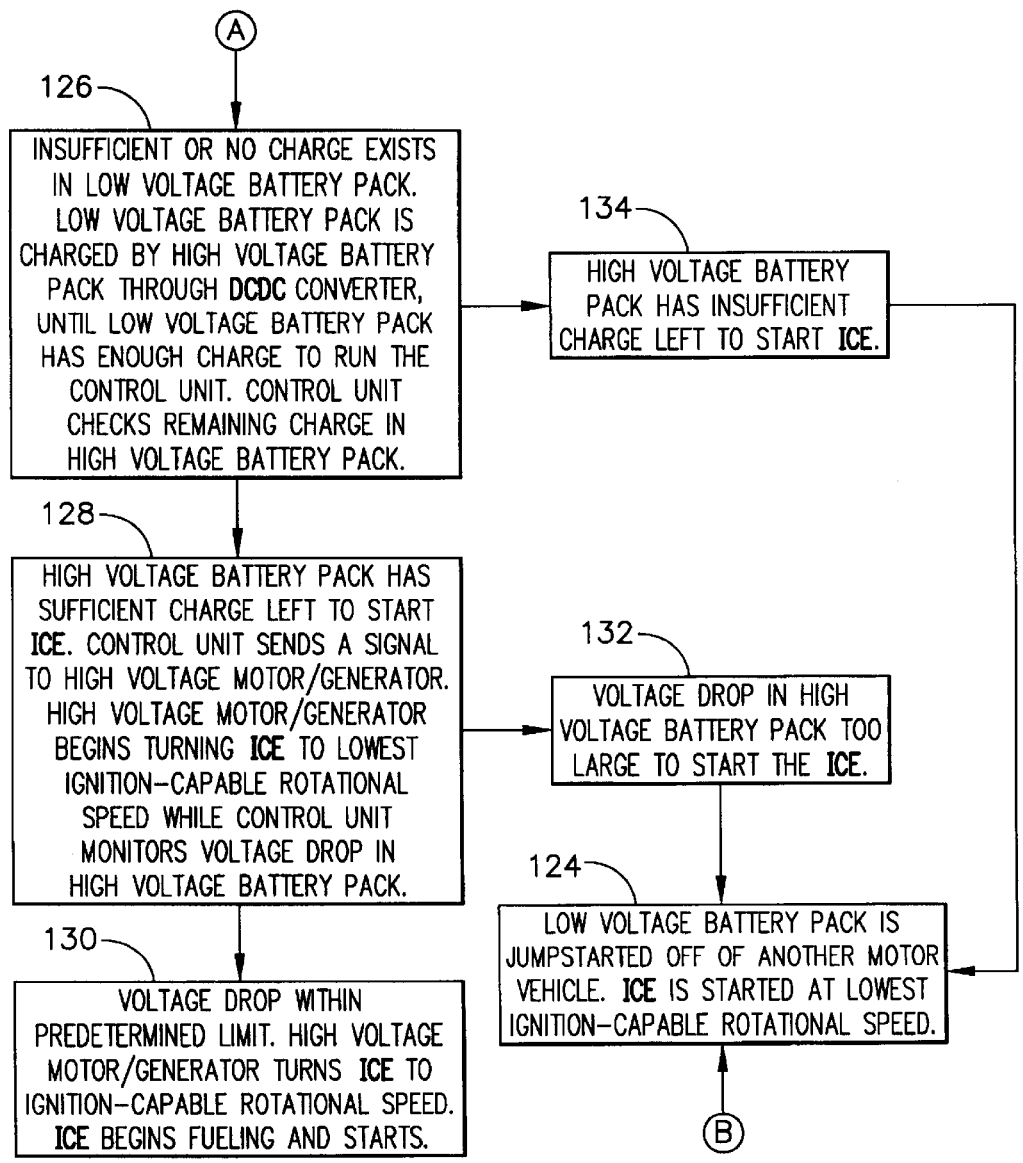

The operation of a first start under normal operating conditions, in accordance with an embodiment of the invention, is illustrated in flow chart form in FIG. 2 with continued reference to FIG. 1. Control unit 28 checks on the internal combustion engine's rotational speed and also checks on the conditions of high voltage battery pack 22 and 12-volt battery pack 20 using sensors 34 and 36, respectively (step 100). If there is sufficient charge in both battery packs to start ICE 10 (step 102), then control unit 28 proceeds to send a signal to 12-volt starter motor 19 through electrical leads 32. The 12-volt starter motor begins turning the ICE (without fuel being delivered to the engine) up to an initial, predetermined rotational speed (for example, 70–120 RPM) while the control unit monitors the voltage drop in the 12-volt battery pack and the ICE rotational speed (step 104). If the voltage drop in the 12-volt battery pack is within a predetermined limit, control unit 28 sends a signal through electrical leads 30 to MG 11 as soon as this initial ICE rotational speed is reached. MG 11 then begins to turn ICE 10 in combination with starter motor 19 to a second, predetermined rotational speed (for example, 100–200 RPM). From the initial, predetermined ICE rotational speed to the second, predetermined ICE rotational speed, both MG 11, through coupling 24, and starter motor 19 turn the ICE (which is still not receiving fuel) in tandem, while control unit monitors ICE RPM and the voltage drop in both 12-volt battery pack 20 and high voltage battery pack 22 with sensors 36 and 34, respectively (step 106). If the voltage drops in both the 12-volt battery pack and the high voltage battery pack are within predetermined parameters, control unit 28 maintains both MG 11 and 12-volt starter motor 19 turning the ICE up to the second, predetermined rotational speed. At the second, predetermined rotational speed, the control unit sends a signal to 12-volt starter motor 19, commanding the 12-volt starter motor to stop powering ICE 10 (step 107). If, before reaching the second, predetermined rotational speed, the voltage drop in the 12-volt battery pack is larger than the predetermined limit allows, control unit 28 signals the 12-volt starter motor to stop powering the ICE at a rotational speed lower than the second, predetermined rotational speed (step 115), leaving the MG alone turning the ICE. In either case, MG 11 continues to turn ICE through coupling 24 up to a final, predetermined rotational speed that is sufficiently high (for example, 400–800 RPM, preferably about 600 RPM) to allow for a low emission start, while control unit 28 monitors the voltage drop in the high voltage battery pack (step 108). As long as the voltage drop in the high voltage battery pack is within the predetermined limit, the control unit keeps the MG turning the ICE until the final rotational speed is reached. When the control unit senses that the ICE is turning at this final rotational speed, the control unit commands the ICE to begin fueling and to start combustion (step 109). The 12-volt starter motor thus participates in each of the internal combustion engine's first starts and thus the 12-volt starter motor is used regularly, thereby avoiding seize up from disuse or infrequent use, while still allowing for low emission ICE starts. In any operation of the hybrid motor vehicle after the first start, MG 11 handles any ICE quick starts, except in emergency situations in which the high voltage system is not capable of starting the ICE. In such emergency situations, the 12-volt starter motor turns the ICE up to a low, but ignition-capable, rotational speed.

Dual voltage engine start system 19 is designed to overcome any of the drawbacks inherent in the other hybrid motor vehicles' electrical configurations. If, for example, the initial startup voltage in 12-volt battery pack 20 is within the predetermined parameter, or seemingly within the parameter before startup, but the voltage drop measured by sensor 36, and relayed to control unit 28, once starter motor 19 begins turning (step 104) is greater than the predetermined limit allows, control unit 28 responds by sending a signal to MG 11 to initiate a MG start assist at a rotational speed lower than the initial, predetermined rotational speed. MG 11 begins turning ICE 10 in combination with starter motor 19 at this lower-than-normal rotational speed until control unit 28 signals starter motor 19 to stop turning the ICE (step 110). Under these conditions the MG alone turns ICE 10 at a rotational speed that is lower than the initial, predetermined rotational speed. As MG 11 continues to turn ICE 10 toward the final, predetermined rotational speed, the control unit monitors the voltage drop in battery pack 22 (step 112). If the voltage drop in battery pack 22, as measured by sensor 34, is within the predetermined parameter, MG 11 continues turning the ICE up to the final, predetermined rotational speed (step 109). If, on the other hand, control unit 28 senses through sensor 34 that the voltage drop in battery pack 22 is greater than the predetermined limit, control unit 28 commands the ICE to begin fueling at a lower rotational speed than normal, giving higher priority to reliably starting the ICE (step 116).

A similar situation ensues given a larger than normal voltage drop in high voltage battery pack 22 under otherwise normal operating conditions. In this situation, the 12-volt starter motor, functioning as it does under normal operating conditions, turns the ICE up to the initial, predetermined rotational speed (step 104). If control unit 28 measures, through sensor 34, a sufficient or seemingly sufficient amount of charge in battery pack 22, a signal is sent through electrical leads 30 commanding MG 11 to start turning ICE 10. The 12-volt motor will continue turning ICE 10 to the second, predetermined rotational speed in combination with MG 11 until the 12-volt motor is commanded to stop by control unit 28 (step 106). If, during the period with both MG 11 and 12-volt starter motor 19 turning the ICE, or at the point where MG 11 alone is turning the ICE, the control unit senses through sensor 34 a voltage drop in battery pack 22 larger than the predetermined limit, the control unit responds by signaling the ICE to begin fueling at a rotational speed lower than the final, predetermined rotational speed (step 116). Thus, the control unit again gives higher priority to reliably starting the ICE. The hybrid start system, in accordance with the invention, thus allows a robust ICE start even if either the 12-volt or the high voltage systems would not have been able to do so alone.

In a situation where the control unit senses that 12-volt battery pack 20 is within operating conditions but high voltage battery pack 22 has insufficient charge, the control unit sends a signal through electrical leads 32 commanding 12-volt starter motor 19 to turn ICE 10, while the control unit monitors the voltage drop in battery pack 20 and ICE rotational speed (step 118). If the voltage drop is within the predetermined limit, the control unit then commands the ICE to begin fueling at the lowest rotational speed where ignition is still able to occur (step 120).

Should a large enough voltage drop occur in battery pack 20 while starter motor 19 is turning that the ICE is unable to reach an ignition-capable rotational speed (step 122) and the high voltage system is not functional, the 12-volt portion of the hybrid motor vehicle can be jumpstarted from another vehicle or 12-volt battery pack, allowing the ICE to be started (step 124). The 12-volt portion of the hybrid motor vehicle can also be jumpstarted if both the 12-volt battery pack and the high voltage battery pack have insufficient charge at the beginning of the first start (step 125).

If the 12-volt battery pack is initially without charge when the first start occurs, but the high voltage battery has charge, high voltage battery pack 22 automatically charges 12-volt battery pack 20 through DC-DC converter 40, until a sufficient charge exists in the 12-volt battery pack to run the control unit. The control unit then checks the remaining amount of charge in the high voltage battery pack (step 126). If the control unit senses through sensor 34 that the charge in battery pack 22 is sufficient to start the ICE, then the control unit sends a signal through electrical leads 30 to MG 11. MG 11 then begins turning ICE 10 toward the lowest rotational speed where ignition can still occur while the control unit monitors the voltage drop in the high voltage battery pack (step 128). If the voltage drop is within the predetermined limit, the control unit has the MG continue turning the ICE to the lowest ignition-capable rotational speed. When this ICE RPM is reached, the control unit commands the ICE to begin fueling and start combustion (step 130). Again, the system places higher priority on reliably starting the ICE. If the voltage drop in the high voltage battery pack is too high to start the ICE (step 132), or if there is just not enough charge left in high voltage battery pack 22 to start the ICE after battery pack 22 charges 12-volt battery pack 20 (step 134), then the 12-volt battery can be jumpstarted by another motor vehicle or 12-volt battery (step 124).

Thus, it is apparent that there has been provided, in accordance with the invention, a dual voltage engine start system and method that meets the needs set forth above. The inventive system uses conventional electrical systems found in hybrid motor vehicles, avoiding the need for expensive, oversized DC-DC converters and inverter switches and thus reducing manufacturing costs. The system provides high rotational speed, low emissions heat engine first starts while also providing a reliable backup system capable of starting the heat engine should part of the electrical system fail. Although the invention has been described and illustrated with reference to specific embodiments thereof, it is not intended that the invention be limited to such illustrative embodiments. For example, the heat engine need not be an internal combustion engine but could be a gas powered turbine or the like. In both the low voltage battery pack and the high voltage battery pack, one or more batteries may make up the battery pack depending on the amount of power needed from each battery pack. Those of skill in the art will recognize that many other variations and modifications of such illustrative embodiments are possible without departing from the spirit of the invention. Accordingly, it is intended to be included within the invention all such variations and modifications as fall within the scope of the appended claims.

What is claimed is:

1. A method for performing a first start of a heat engine of a hybrid electric vehicle, the motor vehicle having a low voltage starter motor and a high voltage motor/generator, the method comprising the steps of:

coupling the starter motor to the heat engine to turn the heat engine until the heat engine attains a first rotational speed;

coupling the motor/generator and the starter motor to the heat engine in parallel when the heat engine attains the first rotational speed to turn the heat engine to a second rotational speed greater than the first rotational speed;

decoupling the starter motor from the heat engine when the heat engine attains the second rotational speed;

continuing to turn the heat engine with the motor/generator until the heat engine attains a third rotational speed greater than the second rotational speed; and fueling the heat engine when the heat engine attains the third rotational speed.

2. The method of claim 1 wherein the step of coupling the starter motor comprises the step of coupling the starter motor to the heat engine to turn the heat engine until the heat engine attains a rotational speed of about 70–120 RPM.

3. The method of claim 2 wherein the step of coupling the motor/generator and the starter motor comprises the step of coupling the motor/generator and the starter motor to the heat engine in parallel and in tandem when the heat engine attains a rotational speed of about 70–120 RPM to increase the rotational speed of the heat engine to a rotational speed of about 100–200 RPM.

4. The method of claim 3 wherein the step of continuing to turn the heat engine comprises the step of continuing to turn the heat engine with the motor/generator until the heat engine attains a rotational speed of about 400–800 RPM.

5. A method for performing a first start of a heat engine of a hybrid electric vehicle, the hybrid electric vehicle comprising a starter motor operable from a first voltage source and a motor/generator operable from a second voltage source, the method comprising the steps of:

monitoring voltage level of the first voltage source, voltage level of the second voltage source, and rotational speed of the heat engine;

selectively coupling the starter motor to the heat engine during a first time period to turn the heat engine in response to the voltage level monitored at the first voltage source and in response to the monitored rotational speed of the heat engine;

simultaneously with at least a portion of the first time period selectively coupling the motor/generator to the heat engine to turn the heat engine in response to the voltage level monitored at the second voltage source and in response to the monitored rotational speed of the heat engine; and fueling the heat engine in response to the monitored rotational speed of the heat engine.

6. The method of claim 5 wherein the step of selectively coupling the starter motor to the heat engine comprises the steps of:

coupling the starter motor to the heat engine in response to monitoring the voltage level of the first voltage source to be within a predetermined first voltage source operating limit; and maintaining the starter motor coupled to the heat engine until the monitored rotational speed of the heat engine attains a first predetermined rotational speed or until the monitored voltage level of the first voltage source drops below the predetermined first voltage source operating limit.

7. The method of claim 6 wherein the step of selectively coupling the motor/generator to the heat engine comprises the steps of:

coupling the motor/generator to the heat engine in response to monitoring the voltage level of the second voltage source to be within a predetermined second voltage source operating limit and in response to monitoring the rotational speed of the heat engine to have attained a second rotational speed less than the first rotational speed;

continuing to monitor the voltage level of the second voltage source; and maintaining the motor/generator coupled to the heat engine until the monitored rotational speed of the heat engine attains a third predetermined rotational speed greater than the first rotational speed or until the monitored voltage level of the second voltage source drops below the predetermined second voltage source operating limit.

8. The method of claim 7 wherein the step of fueling comprises the step of fueling in response to the monitored rotational speed of the heat engine attaining the third predetermined rotational speed or in response to the monitored voltage level of the second voltage source dropping below the predetermined second voltage source operating limit.

9. The method of claim 5 wherein the step of selectively coupling the motor/generator to the heat engine comprises the steps of:

coupling the motor/generator to the heat engine in response to monitoring the voltage level of the second voltage source to be within a predetermined second voltage source operating limit and in response to monitoring the voltage level of the first voltage source to be below the predetermined first voltage source operating limit;

decoupling the starter motor from the heat engine in response to monitoring the voltage level of the first voltage source to be below the predetermined first voltage source operating limit;

continuing to monitor the voltage level of the second voltage source; and maintaining the motor/generator coupled to the heat engine until the monitored rotational speed of the heat engine attains a predetermined rotational speed or until the monitored voltage level of the second voltage source drops below the predetermined second voltage source operating limit.

10. The method of claim 9 wherein the step of fueling comprises the step of fueling in response to the monitored rotational speed of the heat engine attaining the predetermined rotational speed or in response to the monitored voltage level of the second voltage source dropping below the predetermined second voltage source operating limit.

11. The method of claim 5 further comprising the step of charging the first voltage source from the second voltage source through a DC-DC converter if the first voltage source is below a predetermined first voltage source operating limit.

12. The method of claim 5 further comprising the step of coupling the first voltage source to an auxiliary battery if the first voltage source is below a predetermined first voltage source operating limit and the second voltage source is below a predetermined second voltage source operating limit.

\* \* \* \* \*